(12) United States Patent
Zhang et al.

(10) Patent No.: US 11,132,363 B2
(45) Date of Patent: Sep. 28, 2021

(54) DISTRIBUTED COMPUTING FRAMEWORK AND DISTRIBUTED COMPUTING METHOD

(71) Applicant: BEIJING BAIDU NETCOM SCIENCE AND TECHNOLOGY CO., LTD., Beijing (CN)

(72) Inventors: Jianwei Zhang, Beijing (CN); Yuncong Zhang, Beijing (CN); Cong Wang, Beijing (CN); Yao Xu, Beijing (CN); Chunyang Wen, Beijing (CN); Xin Huang, Beijing (CN); Zhan Song, Beijing (CN); Guanyin Zhu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 222 days.

(21) Appl. No.: 16/352,576

(22) Filed: Mar. 13, 2019

(65) Prior Publication Data

US 2019/0213188 A1 Jul. 11, 2019

Related U.S. Application Data

(63) Continuation of application No. PCT/CN2016/102122, filed on Oct. 14, 2016.

(30) Foreign Application Priority Data

Sep. 21, 2016 (CN) .......................... 201610836654.7

(51) Int. Cl.
*G06F 16/24* (2019.01)
*G06F 16/2453* (2019.01)
(Continued)

(52) U.S. Cl.
CPC ...... *G06F 16/24537* (2019.01); *G06F 9/5066* (2013.01); *G06F 16/182* (2019.01);
(Continued)

(58) Field of Classification Search
CPC . G06F 16/24537; G06F 16/243; G06F 16/182
See application file for complete search history.

(56) References Cited

U.S. PATENT DOCUMENTS 9,229,979 B2 1/2016 Shankar et al.
2013/0198159 A1* 8/2013 Hendry ................ G06F 16/242
707/706
(Continued)

FOREIGN PATENT DOCUMENTS

CN 102799622 A 11/2012
CN 103399927 A 11/2013
(Continued)

OTHER PUBLICATIONS

International Search Report dated Jun. 30, 2017 for International Application No. PCT/CN2016/102122, 5 pages.
Written Opinion of the International Searching Authority dated Jun. 30, 2017 for International Application No. PCT/CN2016/102122, 3 pages.

*Primary Examiner* — Loc Tran
(74) *Attorney, Agent, or Firm* — Knobbe, Martens, Olson & Bear, LLP

(57) ABSTRACT

A distributed computing framework and a distributed computing method are provided. A specific embodiment of the distributed computing framework includes: a parsing unit, configured to parse an expression of a distributed computing task, and determine an operator and a field corresponding to the operator; and an operator unit, configured to provide the operator, input parameters of the operator including: the field and a field-type distributed dataset. The type of parameters received and returned by any operator may be the field-type distributed dataset, and any operator may operate on the data corresponding to the field in the field-type distributed dataset. Therefore, any operator needs to be implemented once to realize the reuse of the operator. The distributed computing task is expressed in a simple expres-
(Continued)

sion, which simplifies the complexity of writing a distributed computing program with the distributed computing framework used by the user.

9 Claims, 3 Drawing Sheets

(51) Int. Cl.
    *G06F 9/50*     (2006.01)
    *G06F 40/205*     (2020.01)
    *G06F 16/242*     (2019.01)
    *G06F 16/182*     (2019.01)
    *G06F 16/22*     (2019.01)

(52) U.S. Cl.
    CPC ........ *G06F 16/2228* (2019.01); *G06F 16/243* (2019.01); *G06F 40/205* (2020.01)

(56) References Cited

U.S. PATENT DOCUMENTS

| | | |
|---|---|---|
| 2014/0019437 A1 | 1/2014 | Hays et al. |
| 2014/0164353 A1 | 6/2014 | Shankar et al. |
| 2014/0172898 A1 | 6/2014 | Aguilera et al. |
| 2015/0356162 A1 | 12/2015 | Zhang et al. |
| 2016/0078090 A1 | 3/2016 | Shankar et al. |
| 2016/0371355 A1* | 12/2016 | Massari ................. G06F 16/25 |
| 2017/0192892 A1* | 7/2017 | Pundir ................ G06F 12/0873 |

FOREIGN PATENT DOCUMENTS

| | | |
|---|---|---|
| CN | 103425779 A | 12/2013 |
| CN | 103902592 A | 7/2014 |
| CN | 105786808 A | 7/2016 |

\* cited by examiner

DISTRIBUTED COMPUTING FRAMEWORK AND DISTRIBUTED COMPUTING METHOD

CROSS-REFERENCE TO RELATED APPLICATIONS

This application is a continuation of International Application PCT/CN2016/102122, with an international filing date of Oct. 14, 2016, which claims priority to Chinese Patent Application no. 201610836654.7, filed in China on Sep. 21, 2016, the disclosure of each of which are incorporated herein by reference in its entirety.

TECHNICAL FIELD

The present disclosure relates to the field of computer, specifically relates to the distributed field, and more specifically relates to a distributed computing framework and a distributed computing method.

BACKGROUND

In developing distributed computing programs, a user may use an interface provided by a distributed computing framework, such as a SQL-like interface of the distributed computing framework Hive, or a DataFrame interface of the distributed computing framework Spark to write the distributed computing programs.

However, the interfaces provided by the current distributed frameworks, on the one hand, cannot implement the reuse of operators. Taking the DataFrame interface as an example, a UDF such as max/min/count needs to be provided. The UDF is used to process stand-alone datasets, and an existing operation such as sum/count cannot be reused. Operations applicable on fields are extremely limited. When an operator implemented by the user needs to be used on a given field, the operator cannot be reused. On the other hand, it is inconvenient to describe some distributed computing tasks common in the distributed computing. Taking the SQL-like interface as an example, the SQL-like interface does not support nested datasets. When processing a distributed computing task such as grouping data according to a field and taking the largest n records of the field from each group, if the expression "select field_1, field_2 from table_1 group by field1 order by field_2 desc limit 10" is used, 10 records are actually taken from the whole, rather than 10 records are taken from each group. If the expression "select field_1, field_2 from table_1 group by field1 limit 10 order by field_2 desc" is used, the expression does not conform to the SQL syntax, which makes it impossible to describe the distributed computing task.

SUMMARY

The present disclosure provides a distributed computing framework and a distributed computing method, to solve a part of the technical problems mentioned in the Background.

In a first aspect, the present disclosure provides a distributed computing framework, including: a parsing unit, configured to parse an expression of a distributed computing task, and determine an operator and a field corresponding to the operator, the field indicating an attribute of data in a distributed dataset the operator acting on; and an operator unit, configured to provide the operator, input parameters of the operator comprising: the field and a field-type distributed dataset, the field-type distributed dataset containing at least one element, the element containing a plurality of key-value pairs, a key of each of the plurality of key-value pairs being the field, and a value of each of the plurality of key-value pairs being the data corresponding to the field in the distributed dataset.

In a second aspect, the present disclosure provides a distributed computing method, including: parsing an expression of a distributed computing task, and determining an operator and a field corresponding to the operator, the field indicating an attribute of data in a distributed dataset the operator acting on; generating input parameters of the operator, the input parameters of the operator including: the field and a field-type distributed dataset, the field-type distributed dataset containing at least one element, the element containing a plurality of key-value pairs, a key of each of the plurality of key-value pairs being the field, and a value of each of the plurality of key-value pairs being the data corresponding to the field in the distributed dataset; and performing distributed computing by the operator based on the input parameters.

The distributed computing framework and distributed computing method provided by the present disclosure include a parsing unit, configured to parse an expression of a distributed computing task, and determine an operator and a field corresponding to the operator; and an operator unit, configured to provide the operator, input parameters of the operator including: the field and a field-type distributed dataset. The type of parameters received and returned by any operator may be the field-type distributed dataset, and any operator may operate on the data corresponding to the field in the field-type distributed dataset. Therefore, any operator needs to be implemented once to realize the reuse of the operator. The distributed computing task is expressed in a simple expression, which simplifies the complexity of writing a distributed computing program with the distributed computing framework used by the user. Further, the operator involved in the distributed computing may be determined by the expression, thus optimizing the distributed computing process.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
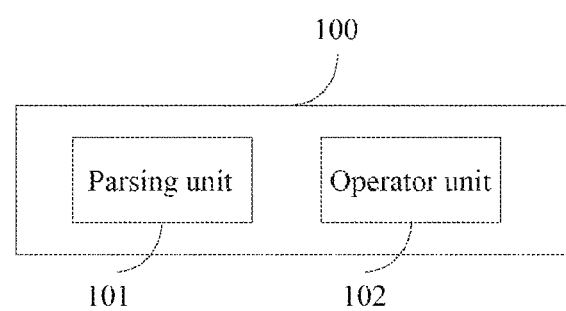
FIG. 1 is a schematic structural diagram of an embodiment of a distributed computing framework according to the present disclosure.

With reference to FIG. 1, a schematic structural diagram of an embodiment of a distributed computing framework according to the present disclosure is illustrated. The distributed computing framework 100 includes: a parsing unit 101 and an operator unit 102. The parsing unit 101 is configured to parse an expression of a distributed computing task, and determine an operator and a field corresponding to the operator, the field indicating an attribute of data in a distributed dataset the operator acting on. The operator unit 102 is configured to provide the operator, input parameters of the operator including: the field and a field-type distributed dataset, the field-type distributed dataset containing at least one element, the element containing a plurality of key-value pairs, a key of each of the plurality of key-value pairs being the field, and a value of each of the plurality of key-value pairs being the data corresponding to the field in the distributed dataset.

In the present embodiment, the distributed computing task may be represented by an expression. The expression of the distributed computing task may include an operator keyword corresponding to each operator and a field keyword corresponding to the field indicating the attribute of the data of the distributed dataset on which the operator acts. The parsing unit may parse the operator keyword and the field keyword in the expression to determine the operator and the field corresponding to the operator.

Taking the data required by the distributed computing task is the click rate data of websites as an example, the click rate data of websites includes two parts: website data and click rate data. The operator may act on the website data and the click rate data. The expression of the distributed computing task may include the operator keyword and the field keyword. The parsing unit may determine the field corresponding to the operator and the operator, that is, a websites field and a click rate field, by parsing the operator keyword and the field keyword in the expression of the distributed computing task.

In the present embodiment, the distributed computing framework may provide a field-type distributed dataset SchemaPCollection. The data structure PCollection may represent a distributed dataset. The data structure SchemaPCollection may represent a structured PCollection with fields. The data structure SchemaPCollection may be equivalent to a PCollection in which each element is a dictionary. The input parameters of each operator provided by the operator unit may contain the SchemaPCollection and the fields, and the type of the returned value may also be SchemaPCollection.

In some alternative implementations of the present embodiment, the operator unit includes: a field-type distributed dataset generation operator, configured to convert the distributed dataset corresponding to the data required by the distributed computing task into the field-type distributed dataset based on the field, the element in the field-type distributed dataset containing a plurality of key-value pairs. Here, the key of each of the plurality of key-value pairs is the field, and the value of each of the plurality of key-value pairs is the data corresponding to the field in the distributed dataset.

Taking the data required by the distributed computing task is the click rate data of a website as an example, each piece of data includes two parts: multiple websites and the click rate. The data required by the distributed computing task may be PCollection. The field-type distributed dataset generation operator may receive the field parameters, and the field parameters include the websites field and the click rate field, and generate the SchemaPCollection corresponding to the data required by the distributed computing task. Each element in the SchemaPCollection corresponding to the data required by the distributed computing task may be a dictionary. The dictionary includes a plurality of key-value pairs, and the key may be a website set or a click rate. The value corresponding to the key website set is a plurality of websites, and value corresponding to the key click rate is the click rate data.

In some alternative implementations of the present embodiment, the operator unit includes: a splitting operator, configured to combine the key-value pairs containing different keys in each of the elements in the field-type distributed dataset, to obtain a field-type distributed dataset with the elements including the key-value pairs containing different keys.

In some alternative implementations of the present embodiment, the operator unit includes: a grouping operator, configured to group the elements in the field-type distributed dataset based on the value corresponding to the key indicated by a grouping field in the elements in the field-type distributed dataset, to obtain a plurality of grouped field-type distributed datasets. Here, each of the values corresponding to the key indicated by the grouping field corresponds to each of the plurality of grouped field-type distributed datasets, and the each of the plurality of grouped field-type distributed dataset includes at least one element containing the value corresponding to the key indicated by the grouping field.

In some alternative implementations of the present embodiment, the operator unit includes: a traversal operator, configured to perform, based on a traversal field, operations on the value corresponding to the key indicated by the traversal field in the elements in the each of the plurality of grouped field-type distributed datasets.

In some alternative implementations of the present embodiment, the operator unit includes: an aggregation operator, configured to aggregate results obtained by performing operations on the value corresponding to the key indicated by the traversal field in the elements in the each of the plurality of grouped field-type distributed datasets.

In the present embodiment, the operator unit may include a splitting operator "select operator" and an aggregation operator "agg operator." The distributed computing framework may provide the user with a select interface and an agg interface corresponding to the select operator and the agg operator. Auxiliary interfaces, such as a join interface, a distinct interface, or a sort by interface, may be packaged based on the select interface and the agg interface.

In the present embodiment, the SchemaPCollection may be processed through the select interface and the agg interface. Thus, various interfaces acting on the PCollection existing in the distributed computing framework may be reused, and the select interface and the agg interface may be combined with any existing interfaces acting on the PCollection to form operations that may complete various distributed computing tasks, thereby realizing mature functions.

The following is a description of the role of the operator provided by the distributed computing framework in the present disclosure in combination with codes:

The data required by the distributed computing task is the click rate data of the following websites: ('alibaba.com, baidu.com, tencent.com', 1), ('baidu.com, tencent.com', 2), ('alibaba.com, tencent.com', 3), ('alibaba.com, baidu.com', 2), ('alibaba.com, jd.com', 1). The distributed computing task is grouping by websites, and calculating the sum of the click rate, the maximum click rate, and the average of the click rates of each website.

Some of the codes that may be used to perform the distributed computing task are as follows:

```
p=base.Pipeline.create('local')
  analytics=p.parallelize([('alibaba.com,baidu.com,tenc
ent.com', 1),( 'baidu.com,tencent.com',2),( 'alibaba.com,te
ncent.com', 3), ('alibaba.com,baidu.com',2),( 'alibaba.com
,jd.com', 1)])\
    .apply(schema.from_tuple, ['websites', 'clicknum'])
    .apply(schema.select, lambda cols: {
        'website': cols['websites'].flat_map(lambda line: l
ine.split(',')),
        'clicknum': cols['clicknum']
    })
    .apply(schema.group_by,['website'])\
    .apply_values(schema.agg,lambda cols: {
                 'max_click_num': cols['clicknum'].max( ),
                 'sum_click_num':
                 cols['clicknum'].flat_map(lambda
x: x['x']),
                 'avg_click_num': cols['clicknum'].sum( ) /
cols['clicknum'].count( )
    })
```

In the present embodiment, each line of code may be equivalent to an expression, and the user may write the code of the distributed computing task in the form of an expression. The distributed computing framework may provide an apply syntactic sugar, and the semantics of the apply syntactic sugar may be:

.apply(f, *args) is equivalent to f(pcollection, *args)

Data required by the distributed computing task ('alibaba.com, baidu.com, tencent.com', 1), ('baidu.com, tencent.com', 2), ('alibaba.com, tencent.com', 3), ('alibaba.com, baidu.com', 2), ('alibaba.com, jd.com', 1) is a distributed dataset PCollection.

For .apply(schema.from_tuple, ['websites', 'clicknum']) in the above code, the parsing unit may determine the field-type distributed dataset generation operator based on the operator keyword from_tuple. The fields websites and clicknum are determined from the field keywords websites and clicknum. The field-type distributed dataset generation operator may convert the PCollection corresponding to the data required by the distributed computing task into the field-type distributed dataset SchemaPCollection based on the field websites and the field clicknum. The SchemaPCollection contains a plurality of elements, each of which contains a plurality of key-value pairs. The key of each key-value pair is a field, and the value of each key-value pair is the data corresponding to the field in the PCollection. The converted SchemaPCollection contains 5 elements, each of which may be a dictionary. The dictionary contains the key-value pair consisting of the key websites and the value corresponding to the websites, and a key-value pair consisting of the key clicknum and the value corresponding to clicknum.

The first element contains the key-value pair "websites-alibaba.com, baidu.com, tencent.com" and the key-value pair "clicknum-1."

The second element contains the key-value pair "websites-baidu.com, tencent.com" and the key-value pair "clicknum-2."

The third element contains the key-value pair "websites-alibaba.com, tencent.com," and the key-value pair "clicknum-3."

The fourth element contains the key-value pair "websites-alibaba.com, baidu.com" and the key-value pair "clicknum-2."

The fifth element contains the key-value pair "websites-alibaba.com, jd.com," and the key-value pair "clicknum-1."

For .apply(schema.select, lambda cols: {'website': cols['websites'].flat_map(lambda line: line.split(',')), 'clicknum': cols['clicknum']}) in the above code, the parsing unit may determine the splitting operator based on the operator keyword select. The fields website, clicknum are determined based on the field keywords.

For the key websites in each element in the SchemaPCollection, the flat_map operator may be invoked to split the value corresponding to the key websites by the comma to obtain a key-value pair composed of the key website and the value corresponding to the key website.

After the value corresponding to the key websites is split by the comma, the element in the SchemaPCollection contains key-value pairs consisting of the values corresponding to the key website and the key website, and the key-value pair consisting of the value corresponding to the key clicknum and the key clicknum.

The first element is the key-value pairs "website-alibaba.com," the key-value pair "website-baidu.com," the key-value pair "website-tencent.com," and the key-value pair "clicknum-1."

The second element is the key-value pair "website-baidu.com," the key-value pair "website-tencent.com," and the key-value pair "clicknum-2."

The third element is the key-value pair "website-alibaba.com," the key-value pair "website-tencent.com," and the key-value pair "clicknum-3."

The fourth element is the key-value pair "website-alibaba.com," the key-value pair "website-baidu.com," and the key-value pair "clicknum-2."

The fifth element is the key-value pair "website-alibaba.com," the key-value pair "website-jd.com," and the key-value pair "clicknum-1."

In the present embodiment, the splitting operator may combine the key-value pairs containing different keys in each of the elements in the field-type distributed dataset, to obtain a field-type distributed dataset with the elements including the key-value pairs containing different keys.

The splitting operator may combine the key-value pair corresponding to the key website and the key-value pair corresponding to the key clicknum in each element, to obtain a SchemaPCollection in which each element contains a key-value pair corresponding to the key website and a key-value pair corresponding to the key clicknum.

After combining the key-value pair corresponding to the key website with the key-value pair corresponding to the key clicknum in each element, the first element in the SchemaPCollection is the key-value pair "website-alibaba.com" and the key-value pair "clicknum-1."

The second element is the key-value pair "website-baidu.com" and the key-value pair "clicknum-1."

The third element is the key-value pair "website-tencent.com" and the key-value pair "clicknum-1."

The fourth element is the key-value pair "website-baidu.com" and the key-value pair "clicknum-2."

The fifth element is the key-value pair "website-tencent.com" and the key-value pair "clicknum-2."

The sixth element is the key-value pair "website-alibaba.com" and the key-value pair "clicknum-3."

The seventh element is the key-value pair "website-tencent.com" and the key-value pair "clicknum-3."

The eighth element is the key-value pair "website-alibaba.com" and the key-value pair "clicknum-2."

The ninth element is the key-value pair "website-baidu.com" and the key-value pair "clicknum-2."

The tenth element is the key-value pair "website-alibaba.com" and the key-value pair "clicknum-1."

The eleventh element is the key-value pair "website-jd.com" and the key-value pair "clicknum-1."

For .apply(schema.group_by, ['website']) in the above code, the parsing unit may determine the grouping operator based on the grouping operator keyword group_by. The field website is determined based on the field keyword website.

In the present embodiment, the grouping operator may group the elements in the SchemaPCollection based on the values corresponding to the key website indicated by the grouping field website, to obtain a plurality of grouped SchemaPCollections, and each of the values corresponding to the key website indicated by each grouping field corresponds to each of the plurality of grouped SchemaPCollections. The each of the plurality of grouped SchemaPCollections includes at least one element containing the value corresponding to the key website indicated by the grouping field.

The grouping operator may aggregate the elements with the identical value corresponding to the key website to obtain a grouped SchemaPCollection containing a plurality of key-value pairs of the identical value corresponding to the key website.

The first grouped SchemaPCollection contains the key-value pair "website-baidu.com" and the key-value pair "clicknum-1," the key-value pair "website-baidu.com" and the key-value pair "clicknum-2," and the key-value pair "website-baidu.com" and the key-value pair "clicknum-2."

The second grouped SchemaPCollection contains the key-value pair "website-tencent.com" and the key-value pair "clicknum-1," the key-value pair "website-tencent.com" and the key-value pair "clicknum-2," and the key-value pair "website-tencent.com" and the key-value pair "clicknum-3."

The third grouped SchemaPCollection contains the key-value pair "website-alibaba.com" and the key-value pair "clicknum-1," the key-value pair "website-alibaba.com" and the key-value pair "clicknum-3," the key-value pair "website-alibaba.com" and the key-value pair "clicknum-2," and the key-value pair "website-alibaba.com" and the key-value pair "clicknum-1."

The fourth grouped SchemaPCollection contains the key-value pair "website-jd.com" and the key-value pair "clicknum-1."

For .apply_values(schema.agg, lambda cols: {'max_click_num': cols['clicknum'].max( ), 'sum_click_num':cols['clicknum'].flat_map(lambda x: x['x']), 'avg_click_num': cols['clicknum'].sum( )/cols['clicknum'].count( )}) in the above code, the parsing unit may determine the traversal operator based on the traversal operator keyword apply_values. The field clicknum is determined based on the field keyword clicknum. The traversal operator may perform max, sum, and count operations on the values corresponding to the key clicknum of all the elements in each of the grouped SchemaPCollections based on the traversal field clicknum. Therefore, the maximum click rate, the sum of the click rates, and the average of the click rates of baidu.com, tencent.com, alibaba.com, and jd.com may be calculated separately.

The parsing unit may determine the aggregation operator based on the aggregation operator keyword agg. The aggregation operator may aggregate the results obtained by performing operations on the value corresponding to the key indicated by the traversal field in all the elements in each of the grouped field-type distributed dataset. The aggregation operator may aggregate the maximum click rate, the sum of the click rates, and the average of the click rates of baidu.com, tencent.com, alibaba.com, and jd.com obtained by performing max, sum, and count operations on the values corresponding to the key clicknum in all the elements in each of the grouped SchemaPCollections.

In the present disclosure, the type of parameters received and returned by any operator may be the field-type distributed dataset, and any operator may operate on the data corresponding to the field in the field-type distributed dataset. Therefore, any operator needs to be implemented once to realize the reuse of the operator. The distributed computing task is expressed in a simple expression, which simplifies the complexity of writing a distributed computing program with the distributed computing framework used by the user. Further, the operator involved in the distributed computing may be determined by the expression, thus optimizing the distributed computing process.

Figure 2:
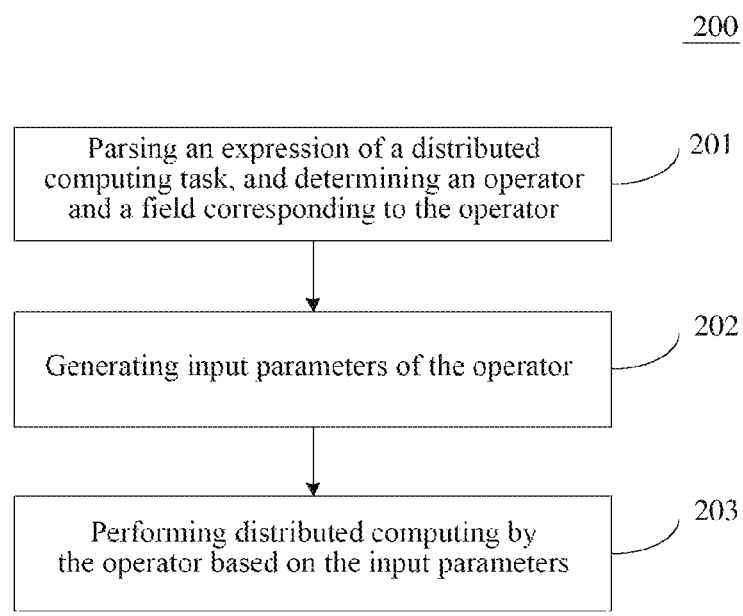
FIG. 2 is a flowchart of an embodiment of a distributed computing method according to the present disclosure.

With reference to FIG. 2, a flow 200 of an embodiment of a distributed computing method according to the present disclosure is illustrated. The method includes the following:

Step 201, parsing an expression of a distributed computing task, and determining an operator and a field corresponding to the operator.

In the present embodiment, the field indicates an attribute of the data in the distributed dataset the operator acting on. The distributed computing task may be represented by an expression. Taking the data required by the distributed computing task is the click rate data of a website as an example, the click rate data of the website includes two parts: website data and click rate data. The operator may act on the website data and the click rate data. The expression of the distributed computing task may include an operator keyword and a field keyword. The parsing unit may determine the field corresponding to the operator and the operator, that is, a websites field and a click rate field, by parsing the operator keyword and the field keyword in the expression of the distributed computing task.

Step 202, generating input parameters of the operator.

In the present embodiment, the input parameters of the operator includes: the field and a field-type distributed dataset. The field-type distributed dataset contains at least one element, and the element contains a plurality of key-value pairs. The key of the key-value pair is the field, and the value of the key-value pair is the data corresponding to the field in the distributed dataset.

In the present embodiment, the distributed computing framework may provide a field-type distributed dataset SchemaPCollection. The data structure PCollection may represent a distributed dataset. The data structure SchemaPCollection may represent a structured PCollection with fields. The data structure SchemaPCollection may be equivalent to a PCollection in which each element is a dictionary. The input parameters of each operator may contain the SchemaPCollection and the field, and the type of the returned value may also be the SchemaPCollection.

In some alternative implementations of the present embodiment, the method further includes: converting the distributed dataset corresponding to the data required by the distributed computing task into the field-type distributed dataset based on the field, the element in the field-type distributed dataset containing a plurality of key-value pairs, the key of each of the key-value pairs being a field, and the value of each of the key-value pairs being the data corresponding to the field in the distributed dataset.

Taking the data required by the distributed computing task is the click rate data of websites as an example, each piece of data includes two parts: multiple websites and the click rate. The data required by the distributed computing task may be PCollection. SchemaPCollection corresponding to the data required by the distributed computing task may be generated based on the websites field and the click rate field. Each element in the SchemaPCollection corresponding to the data required by the distributed computing task may be a dictionary. The dictionary consists of a plurality of key-value pairs, and the key may be a website set or a click rate. The key website set corresponds to the multiple websites, and the key click rate corresponds to the click rate data.

For example, the data required by the distributed computing task is the click rate data for the following websites: ('alibaba.com, baidu.com, tencent.com', 1), ('baidu.com, tencent.com', 2), ('alibaba.com, tencent.com', 3), ('alibaba.com, baidu.com', 2), and ('alibaba.com, jd.com', 1). The data required by the distributed computing task is a distributed dataset PCollection.

In the present embodiment, PCollection corresponding to the data required by the distributed computing task may be converted into the field-type distributed dataset SchemaPCollection based on the field websites and the field clicknum. The SchemaPCollection contains a plurality of elements, each of which contains a plurality of key-value pairs. The key of each key-value pair is a field, and the value of each key-value pair is the data corresponding to the field in the PCollection.

The SchemaPCollection contains five elements, each of which may be a dictionary. The dictionary contains a key-value pair consisting of the key websites and the value corresponding to websites, and a key-value pair consisting of the key clicknum and the value corresponding to clicknum.

The first element contains the key-value pair "websites-alibaba.com, baidu.com, tencent.com" and the key-value pair "clicknum-1."

The second element contains the key-value pair "websites-baidu.com, tencent.com" and the key-value pair "clicknum-2."

The third element contains the key-value pair "websites-alibaba.com, tencent.com," and the key-value pair "clicknum-3."

The fourth element contains the key-value pair "websites-alibaba.com, baidu.com" and the key-value pair "clicknum-2."

The fifth element contains the key-value pair "websites-alibaba.com, jd.com," and the key-value pair "clicknum-1."

Step 203, performing distributed computing by the operator based on the input parameters.

In the present embodiment, after the input parameters of the operator are generated in step 202, the operator may perform distributed computing based on the input parameters, the SchemaPCollection and the field.

In the present embodiment, an apply syntactic sugar may be provided, and the semantics of the apply syntactic sugar may be:

.apply(f, *args) is equivalent to f(pcollection, *args)

In some alternative implementations of the present embodiment, the method further includes: combining key-value pairs containing different keys in each of the elements in the field-type distributed dataset, to obtain a field-type distributed dataset in which the elements include the key-value pairs containing different keys.

In the present embodiment, key-value pairs containing different keys in each of the elements in the field-type distributed dataset may be obtained to obtain a field-type distributed dataset in which each element includes the key-value pairs containing different keys.

Taking the data required by the distributed computing task is the click rate data of a website as an example, each piece of data includes two parts: multiple websites and the click rate. The data required by the distributed computing task may be PCollection.

SchemaPCollection corresponding to the data required by the distributed computing task may be generated based on the websites field and the click rate field. Each element in the SchemaPCollection corresponding to the data required by the distributed computing task may be a dictionary. The dictionary consists of multiple key-value pairs, and the key may be a website set or a click rate. The key website set corresponds to the multiple websites, and the key click rate corresponds to the click rate data.

For example, the element in the SchemaPCollection contains key-value pairs consisting of the values corresponding to the key website and the key website, and the key-value pair consisting of the value corresponding to the key clicknum and the key clicknum.

The first element is the key-value pair "website-alibaba.com," the key-value pair "website-baidu.com," the key-value pair "website-tencent.com," and the key-value pair "clicknum-1."

The second element is the key-value pair "website-baidu.com," the key-value pair "website-tencent.com," and the key-value pair "clicknum-2."

The third element is the key-value pair "website-alibaba.com," the key-value pair "website-tencent.com," and the key-value pair "clicknum-3."

The fourth element is the key-value pair "website-alibaba.com," the key-value pair website-baidu.com, and the key-value pair "clicknum-2."

The fifth element is the key-value pair "website-alibaba.com," the key-value pair "website-jd.com," and the key-value pair "clicknum-1."

The key-value pair corresponding to the key website and the key-value pair corresponding to the key clicknum in each element may be combined to obtain a SchemaPCollection, in which each element includes a key-value pair corresponding to the key website and a key-value pair corresponding to the key clicknum.

After combining the key-value pair corresponding to the key website with the key-value pair corresponding to the key clicknum in each element, the first element in the SchemaPCollection is the key-value pair "website-alibaba.com" and the key-value pair "clicknum-1."

The second element is the key-value pair "website-baidu.com" and the key-value pair "clicknum-1."

The third element is the key-value pair "website-tencent.com" and the key-value pair "clicknum-1."

The fourth element is the key-value pair "website-baidu.com" and the key-value pair "clicknum-2."

The fifth element is the key-value pair "website-tencent.com" and the key-value pair "clicknum-2."

The sixth element is the key-value pair "website-alibaba.com" and the key-value pair "clicknum-3."

The seventh element is the key-value pair "website-tencent.com" and the key-value pair "clicknum-3."

The eighth element is the key-value pair "website-alibaba.com" and the key-value pair "clicknum-2."

The ninth element is the key-value pair "website-baidu.com" and the key-value pair "clicknum-2."

The tenth element is the key-value pair "website-alibaba.com" and the key-value pair "clicknum-1."

The eleventh element is the key-value pair "website-jd.com" and the key-value pair "clicknum-1."

In some alternative implementations of the present embodiment, the method further includes: grouping the elements in the field-type distributed dataset based on the value corresponding to the key indicated by a grouping field in the elements in the field-type distributed dataset, to obtain a plurality of grouped field-type distributed datasets, wherein each of the values corresponding to the key indicated by the grouping field corresponds to each of the plurality of grouped field-type distributed datasets, and the each of the plurality of grouped field-type distributed dataset includes at least one element containing the value corresponding to the key indicated by the grouping field.

For example, the first element in the SchemaPCollection is the key-value pair "website-alibaba.com" and the key-value pair "clicknum-1."

The second element is the key-value pair "website-baidu.com" and the key-value pair "clicknum-1."

The third element is the key-value pair "website-tencent.com" and the key-value pair "clicknum-1."

The fourth element is the key-value pair "website-baidu.com" and the key-value pair "clicknum-2."

The fifth element is the key-value pair "website-tencent.com" and the key-value pair "clicknum-2."

The sixth element is the key-value pair "website-alibaba.com" and the key-value pair "clicknum-3."

The seventh element is the key-value pair "website-tencent.com" and the key-value pair "clicknum-3."

The eighth element is the key-value pair "website-alibaba.com" and the key-value pair "clicknum-2."

The ninth element is the key-value pair "website-baidu.com" and the key-value pair "clicknum-2."

The tenth element is the key-value pair "website-alibaba.com" and the key-value pair "clicknum-1."

The eleventh element is the key-value pair "website-jd.com" and the key-value pair "clicknum-1."

The elements in the SchemaPCollection may be grouped based on the values corresponding to the key website indicated by the website in the elements according to the grouping field website, to obtain a plurality of grouped SchemaPCollections, and the values corresponding to the key website indicated by each grouping field corresponds to a grouped SchemaPCollection. The grouped SchemaPCollection includes at least one element containing the values corresponding to the key website indicated by the grouping field.

The elements with the identical value corresponding to the key website may be aggregated to obtain a grouped SchemaPCollection containing a plurality of key-value pairs of the identical value corresponding to the key website.

The first grouped SchemaPCollection contains the key-value pair "website-baidu.com" and the key-value pair "clicknum-1," the key-value pair "website-baidu.com" and the key-value pair "clicknum-2," and the key-value pair "website-baidu.com" and the key-value pair "clicknum-2."

The second grouped SchemaPCollection contains the key-value pair "website-tencent.com" and the key-value pair "clicknum-1," the key-value pair "website-tencent.com" and the key-value pair "clicknum-2," and the key-value pair "website-tencent.com" and the key-value pair "clicknum-3."

The third grouped SchemaPCollection contains the key-value pair "website-alibaba.com" and the key-value pair "clicknum-1," the key-value pair "website-alibaba.com" and the key-value pair "clicknum-3," the key-value pair "website-alibaba.com" and the key-value pair "clicknum-2," and the key-value pair "website-alibaba.com" and the key-value pair "clicknum-1."

The fourth grouped SchemaPCollection contains the key-value pair "website-jd.com" and the key-value pair "clicknum-1."

In some alternative implementations of the present embodiment, the method further includes: performing, based on a traversal field, operations on the value corresponding to the key indicated by the traversal field in the elements in the each of the plurality of grouped field-type distributed datasets.

Taking grouping the elements in the SchemaPCollection based on the values corresponding to the key website indicated by the website in the elements according to the grouping field website as an example, the first grouped SchemaPCollection contains the key-value pair "website-baidu.com" and the key-value pair "clicknum-1," the key-value pair "website-baidu.com" and the key-value pair "clicknum-2," and the key-value pair "website-baidu.com" and the key-value pair "clicknum-2."

The second grouped SchemaPCollection contains the key-value pair "website-tencent.com" and the key-value pair "clicknum-1," the key-value pair "website-tencent.com" and the key-value pair "clicknum-2," and the key-value pair "website-tencent.com" and the key-value pair "clicknum-3."

The third grouped SchemaPCollection contains the key-value pair "website-alibaba.com" and the key-value pair "clicknum-1," the key-value pair "website-alibaba.com" and the key-value pair "clicknum-3," the key-value pair "website-alibaba.com" and the key-value pair "clicknum-2," and the key-value pair "website-alibaba.com" and the key-value pair "clicknum-1."

The fourth grouped SchemaPCollection contains the key-value pair "website-jd.com" and the key-value pair "clicknum-1."

Max, sum, and count operations may be performed on the values corresponding to the key clicknum of all the elements in each of the grouped SchemaPCollections based on the traversal field clicknum. Therefore, the maximum click rate, the sum of the click rates, and the average of the click rates of baidu.com, tencent.com, alibaba.com, and jd.com may be calculated separately.

In some alternative implementations of the present embodiment, the method further includes: aggregating results obtained by performing operations on the value corresponding to the key indicated by the traversal field in all the elements of the field-type distributed dataset.

Taking the grouped SchemaPCollections as an example, the maximum click rate, the sum of the click rates, and the average of the click rates of baidu.com, tencent.com, alibaba.com, and jd.com obtained by performing max, sum, and count operations on the values corresponding to the key clicknum in all the elements in each of the grouped SchemaPCollections may be aggregated. The output result may be expressed in the following form:

[{'sum_click_num': 7, 'website': 'alibaba.com', 'avg_click_num': 1, 'max_click_num': 3},
{'sum_click_num': 6, 'website': 'tencent.com', 'avg_click_num': 2, 'max_click_num': 3},
{'sum_click_num': 5, 'website': 'baidu.com', 'avg_click_num': 1, 'max_click_num': 2},
{'sum_click_num': 1, 'website': 'jd.com', 'avg_click_num': 1, 'max_click_num': 1}].

In the present disclosure, the type of parameters received and returned by any operator may be the field-type distributed dataset, and any operator may operate on the data corresponding to the field in the field-type distributed dataset. Therefore, any operator needs to be implemented once to realize the reuse of the operator. The distributed computing task is expressed in a simple expression, which simplifies the complexity of writing a distributed computing program with the distributed computing framework used by the user. Further, the operator involved in the distributed computing may be determined by the expression, thus optimizing the distributed computing process.

Figure 3:
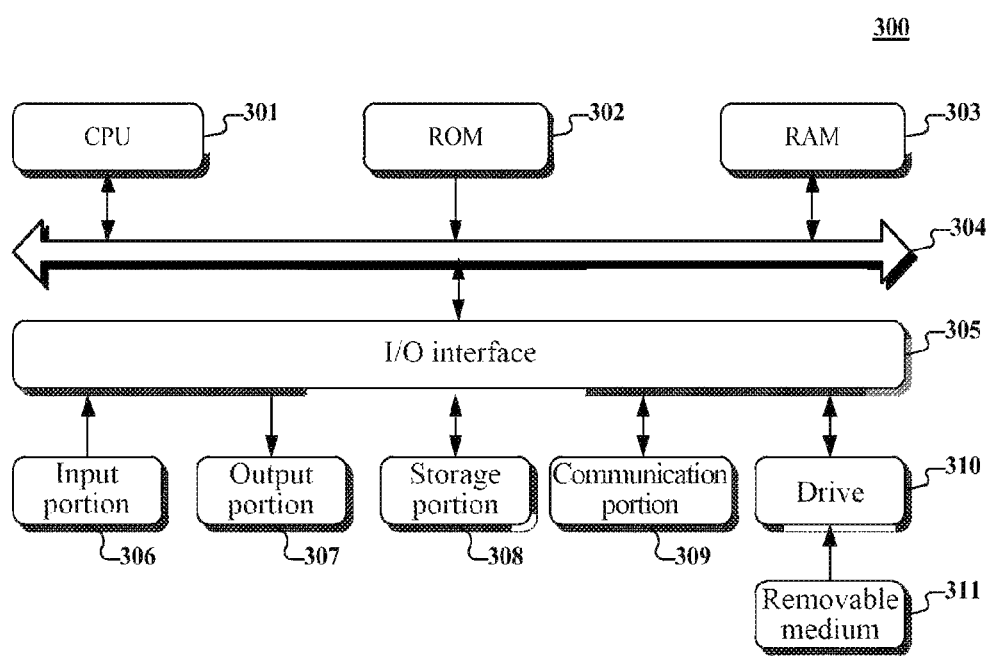
FIG. 3 is a schematic structural diagram of a computer system adapted to implement the distributed computing framework of the embodiments of the present disclosure.

Referring to FIG. 3, a schematic structural diagram of a computer system 300 adapted to implement a distributed computing framework of the embodiments of the present application is shown.

As shown in FIG. 3, the computer system 300 includes a central processing unit (CPU) 301, which may execute various appropriate actions and processes in accordance with a program stored in a read-only memory (ROM) 302 or a program loaded into a random access memory (RAM) 303 from a storage portion 308. The RAM 303 also stores various programs and data required by operations of the system 300. The CPU 301, the ROM 302 and the RAM 303 are connected to each other through a bus 304. An input/output (I/O) interface 305 is also connected to the bus 304.

The following components are connected to the I/O interface 305: an input portion 306 including a keyboard, a mouse etc.; an output portion 307 comprising a cathode ray tube (CRT), a liquid crystal display device (LCD), a speaker etc.; a storage portion 308 including a hard disk and the like; and a communication portion 309 comprising a network interface card, such as a LAN card and a modem. The communication portion 309 performs communication processes via a network, such as the Internet. A drive 310 is also connected to the I/O interface 305 as required. A removable medium 311, such as a magnetic disk, an optical disk, a magneto-optical disk, and a semiconductor memory, may be installed on the drive 310, to facilitate the retrieval of a computer program from the removable medium 311, and the installation thereof on the storage portion 308 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 309, and/or may be installed from the removable media 311.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: parse an expression of a distributed computing task, and determine an operator and a field corresponding to the operator, the field indicating an attribute of data in a distributed dataset the operator acting on; generate input parameters of the operator, the input parameters of the operator comprising: the field and a field-type distributed dataset, the field-type distributed dataset containing at least one element, the element containing a plurality of key-value pairs, a key of each of the plurality of key-value pairs being the field, and a value of each of the plurality of key-value pairs being the data corresponding to the field in the distributed dataset; and perform distributed computing by the operator based on the input parameters.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A distributed computing system, the distributed computing framework comprising:
   at least one processor; and
   a memory storing instructions, the instructions when executed by the at least one processor, cause the at least one processor to perform operations, the operations comprising:
   parsing an expression of a distributed computing task, and determining an operator and a field corresponding to the operator, the field indicating an attribute of data in a distributed dataset the operator acting on;
   generating input parameters of the operator, the input parameters of the operator comprising: the field and a field-type distributed dataset, the field-type distributed dataset containing at least one element, the element containing a plurality of key-value pairs, a key of each of the plurality of key-value pairs being the field, and a value of each of the plurality of key-value pairs being the data corresponding to the field in the distributed dataset;
   converting the distributed dataset corresponding to the data required by the distributed computing task into the field-type distributed dataset based on the field, a given element in the field-type distributed dataset containing a plurality of key-value pairs, the key of each of the plurality of key-value pairs being the field, and the value of each of the plurality of key-value pairs being the data corresponding to the field in the distributed dataset, wherein the plurality of key-value pairs comprised in the given element comprises first key-value pairs, and a second key-value pair, wherein first keys of the first key-value pairs are identical, first values of the first key-value pairs are different, and a second key of the second key-value pair is different from the first key;

forming new elements by combining the first key-value pairs with the second key-value pair respectively, and using the new elements as elements of a field-type distributed dataset, wherein each of the new elements consists of the second key-value pair and one respective first key-value pair; and performing distributed computing by the operator based on the input parameters.

2. The distributed computing framework according to claim 1, wherein the operations further comprise:

grouping the elements in the field-type distributed dataset based on the value corresponding to the key indicated by a grouping field in the elements in the field-type distributed dataset, to obtain a plurality of grouped field-type distributed datasets, wherein each of the values corresponding to the key indicated by the grouping field corresponds to each of the plurality of grouped field-type distributed datasets, and the each of the plurality of grouped field-type distributed dataset comprises at least one element containing the value corresponding to the key indicated by the grouping field.

3. The distributed computing system according to claim 2, wherein the operations further comprise:

performing, based on a traversal field, operations on the value corresponding to the key indicated by the traversal field in the elements in the each of the plurality of grouped field-type distributed datasets.

4. The distributed computing system according to claim 3, wherein the operations further comprise:

aggregating results obtained by performing operations on the value corresponding to the key indicated by the traversal field in the elements in the each of the plurality of grouped field-type distributed datasets.

5. A distributed computing method, the method comprising:

parsing an expression of a distributed computing task, and determining an operator and a field corresponding to the operator, the field indicating an attribute of data in a distributed dataset the operator acting on;

generating input parameters of the operator, the input parameters of the operator comprising: the field and a field-type distributed dataset, the field-type distributed dataset containing at least one element, the element containing a plurality of key-value pairs, a key of each of the plurality of key-value pairs being the field, and a value of each of the plurality of key-value pairs being the data corresponding to the field in the distributed dataset; converting the distributed dataset corresponding to the data required by the distributed computing task into the field-type distributed dataset based on the field, a given element in the field-type distributed dataset containing a plurality of key-value pairs, the key of each of the plurality of key-value pairs being the field, and the value of each of the plurality of key-value pairs being the data corresponding to the field in the distributed dataset, wherein the plurality of key-value pairs comprised in the given element comprises first key-value pairs, and a second key-value pair, wherein first keys of the first key-value pairs are identical, first values of the first key-value pairs are different, and a second key of the second key-value pair is different from the first key;

forming new elements by combining the first key-value pairs with the second key-value pair respectively, and using the new elements as elements of a field-type distributed dataset, wherein each of the new elements consists of the second key-value pair and one respective first key-value pair; and performing distributed computing by the operator based on the input parameters, wherein the method is performed by at least one hardware processor.

6. The method according to claim 5, wherein the method further comprises:

grouping the elements in the field-type distributed dataset based on the value corresponding to the key indicated by a grouping field in the elements in the field-type distributed dataset, to obtain a plurality of grouped field-type distributed datasets, wherein each of the values corresponding to the key indicated by the grouping field corresponds to each of the plurality of grouped field-type distributed datasets, and the each of the plurality of grouped field-type distributed dataset comprises at least one element containing the value corresponding to the key indicated by the grouping field.

7. The method according to claim 6, wherein the method further comprises:

performing, based on a traversal field, operations on the value corresponding to the key indicated by the traversal field in the elements in the each of the plurality of grouped field-type distributed datasets.

8. The method according to claim 7, wherein the method further comprises:

aggregating results obtained by performing operations on the value corresponding to the key indicated by the traversal field in the elements in the each of the plurality of grouped field-type distributed datasets.

9. A non-transitory computer-readable storage medium storing a computer program, the computer program when executed by one or more processors, causes the one or more processors to perform operations, the operations comprising:

parsing an expression of a distributed computing task, and determining an operator and a field corresponding to the operator, the field indicating an attribute of data in a distributed dataset the operator acting on;

generating input parameters of the operator, the input parameters of the operator comprising: the field and a field-type distributed dataset, the field-type distributed dataset containing at least one element, the element containing a plurality of key-value pairs, a key of each of the plurality of key-value pairs being the field, and a value of each of the plurality of key-value pairs being the data corresponding to the field in the distributed dataset;

converting the distributed dataset corresponding to the data required by the distributed computing task into the field-type distributed dataset based on the field, a given element in the field-type distributed dataset containing a plurality of key-value pairs, the key of each of the plurality of key-value pairs being the field, and the value of each of the plurality of key-value pairs being the data corresponding to the field in the distributed dataset, wherein the plurality of key-value pairs comprised in the given element comprises first key-value pairs, and a second key-value pair, wherein first keys of the first key-value pairs are identical, first values of the first key-value pairs are different, and a second key of the second key-value pair is different from the first key;

forming new elements by combining the first key-value pairs with the second key-value pair respectively, and using the new elements as elements of a field-type distributed dataset, wherein each of the new elements consists of the second key-value pair and one respective first key-value pair; and performing distributed computing by the operator based on the input parameters.

\* \* \* \* \*